United States Patent
Hjertvikrem

(10) Patent No.: US 10,931,178 B2
(45) Date of Patent: Feb. 23, 2021

(54) CONTROL SYSTEM AND METHOD FOR AN ELECTRIC ACTUATOR WITH FAIL-SAFE FUNCTIONALITY

(71) Applicant: Vetco Gray Scandinavia AS, Sandvika (NO)

(72) Inventor: Terje Hjertvikrem, Stavanger (NO)

(73) Assignee: Vetco Gray Scandinavia AS, Sandvika (NO)

( * ) Notice: Subject to any disclaimer, the term of this patent is extended or adjusted under 35 U.S.C. 154(b) by 120 days.

(21) Appl. No.: 16/316,997

(22) PCT Filed: Jul. 10, 2017

(86) PCT No.: PCT/EP2017/067290
§ 371 (c)(1),
(2) Date: Jan. 10, 2019

(87) PCT Pub. No.: WO2018/011150
PCT Pub. Date: Jan. 18, 2018

(65) Prior Publication Data
US 2019/0229591 A1    Jul. 25, 2019

(30) Foreign Application Priority Data

Jul. 11, 2016 (NO) .................................. 20161153
Jun. 23, 2017 (NO) .................................. 20171029

(51) Int. Cl.
*H02K 11/33* (2016.01)
*H02K 11/00* (2016.01)
(Continued)

(52) U.S. Cl.
CPC ............. *H02K 11/33* (2016.01); *F16K 31/04* (2013.01); *H02J 9/061* (2013.01); *H02K 11/0094* (2013.01); *H02K 2213/06* (2013.01)

(58) Field of Classification Search
CPC . H02K 11/0094; H02K 11/33; H02K 2213/06
(Continued)

(56) References Cited

U.S. PATENT DOCUMENTS 6,257,549 B1 * 7/2001 Hopper ................... H02J 9/06
                                                                    251/129.11
6,488,260 B1   12/2002 Dietz
(Continued)

OTHER PUBLICATIONS

International Search Report issued in connection with corresponding PCT application No. PCT/EP2017/067290 dated Oct. 9, 2017.
(Continued)

*Primary Examiner* — Jose A Gonzalez Quinones
(74) *Attorney, Agent, or Firm* — Baker Hughes Patent Org.

(57) ABSTRACT

A control system is disclosed for an electric actuator comprising an electric motor, an external supply of electric energy, an energy storage device and a first motor control module which controls the supply of energy to the motor in normal operation. A second motor control module controls the supply of energy to the motor in fail-safe mode. The first motor control module and the second motor control module are connected in parallel via a fail-safe switch which is arranged to override the control executed by the first motor control module to set the control system in fail-safe mode by activation of the second motor control module in either case of: the energy level in the energy storage device reaching, or falling below, a predetermined value, or failure in the external energy supply, or in response to an operator command. A method of controlling an electric actuator in a control system is also disclosed.

13 Claims, 2 Drawing Sheets

(51) Int. Cl.
*F16K 31/04* (2006.01)
*H02J 9/06* (2006.01)

(58) Field of Classification Search
USPC .............................. 310/68 B, 68 R, 75 R, 98
See application file for complete search history.

(56) References Cited

U.S. PATENT DOCUMENTS

| | | | |
|---|---|---|---|
| 6,595,487 B2 | 7/2003 | Johansen et al. | |
| 8,281,863 B2 | 10/2012 | Voss | |
| 8,973,451 B2 | 3/2015 | Oswald | |
| 2006/0100718 A1* | 5/2006 | Huffington | G05B 9/03 700/19 |
| 2009/0255773 A1* | 10/2009 | Seufert | F16D 48/064 192/48.2 |
| 2013/0312850 A1* | 11/2013 | Bedini | F16K 17/042 137/492.5 |
| 2016/0072284 A1 | 3/2016 | Stromsvik et al. | |

OTHER PUBLICATIONS

Vidar Sten-Halvorsen FMC Technologies et,. al., "All Electric Subsea Tree System", Offshore Technology Confer, No. OTC 19547, May 5, 2008, pp. 1-9, XP00720076, p. 4, paragraph "system power" p. 7, line "PSD".

* cited by examiner

CONTROL SYSTEM AND METHOD FOR AN ELECTRIC ACTUATOR WITH FAIL-SAFE FUNCTIONALITY

TECHNICAL FIELD OF THE INVENTION

The present invention relates to a control system for an electric actuator including a fail-safe function. More specifically, the present invention relates to a control system for an electric actuator comprising an electric motor, an external supply of electric energy, a chargeable energy storage device and a first motor control module which controls the supply of energy to the motor in normal operation. The invention also relates to a control method providing fail-safe functionality in an electric actuator.

BACKGROUND AND PRIOR ART

Figure 1:
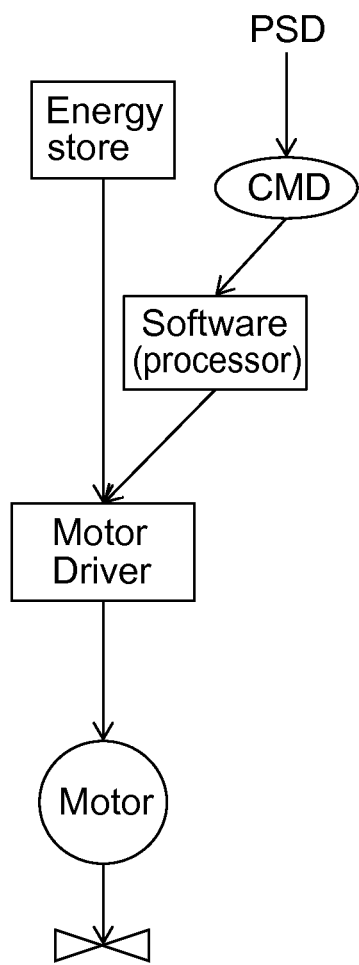
Figure 2:
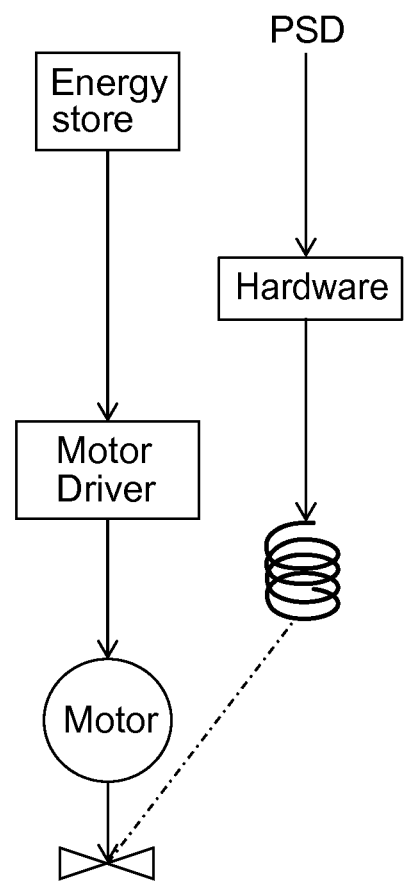

In many industries, not least when working subsea, it is essential to have good fail-safe systems. FIGS. 1 and 2 show examples of known fail-safe systems for valves that are used subsea. FIG. 1 shows a control system wherein fail-safe functionality is based on software code and input command (CMD) which can be released in connection with a process shutdown (PSD). It can be a complicated and cumbersome process to obtain and update an acceptable level of security in a software based fail-safe system. FIG. 2 shows a system wherein fail-safe functionality is based on a spring that drives the valve into fail-safe position upon request of a process shutdown. A spring based system can be complicated to implement with rotating multi-turn actuators. Furthermore, a spring based system can be space consuming which again leads to larger overall structures.

There is a trend in the subsea industry moving towards the use of electric actuators instead of hydraulic actuators. Batteries are becoming an alternative to the spring/pressure tank in safety systems.

In automobiles, it is known to use a battery in connection with the anti-lock braking system, e.g. using batteries in safety systems and in systems that require uptime or uninterrupted operation is known. For example, the telecommunication industry uses batteries as emergency power supply. It is also known to use battery operated UPS (uninterruptible power supply) for emergency operation.

In the oil industry, as well as in other industrial fields, there is an increased focus on cost savings and on the increasing complexity of structures and control systems. As a consequence, there is a need for solutions providing simplified structures and systems.

SUMMARY OF THE INVENTION

It is an object of the present invention to provide an improved control system with an independent fail-safe function for electrically operated actuators.

It is an object of the present invention to provide a control system and a method for an electrical actuator having a fail-safe function that avoids the potential hazards connected with updating software for software based fail-safe functionality.

To be more specific, the present invention provides a control system for an electric actuator comprising an electric motor, an external supply of electric energy, a chargeable energy storage device and a first motor control module which controls the supply of energy to the motor in normal operation. A second motor control module which controls the supply of energy to the motor in fail-safe mode is arranged, wherein the first motor control module and the second motor control module are connected in parallel via a fail-safe switch which is arranged to override the control executed by the first motor control module to set the control system in fail-safe mode by activation of the second motor control module in either case of the energy level in the energy storage device reaching, or falling below, a predetermined value, or failure in the external energy supply, or in response to an operator command.

One embodiment of this solution foresees that the first motor control module is arranged for controlling the supply of energy to the motor by executing software coded instructions, whereas the second motor control module is arranged for controlling the supply of energy to the motor as pre-determined by built-in functionality of its components.

The present invention provides a robust fail-safe functionality which operates independently from control software.

Another embodiment foresees that a motor drive module is arranged for modulation of the energy supplied to the motor according to input from the software implemented first motor control module in normal operation, or according to input from the hardware operated second motor control module in fail-safe mode.

One embodiment foresees that the energy level status in the energy storage device is monitored by the motor drive module and reported to the second motor control module.

Another embodiment foresees that the energy level status in the energy storage device is monitored by the second motor control module.

In one embodiment of the invention, a Hall sensor is arranged to detect the rotary position of the motor or the rotary position of a motor shaft. In one embodiment of the invention, a resolver module is arranged to detect the position of a gear transmission that is arranged for converting the rotation of the motor to a rotary or linear motion.

The invention thereby relates to a control system comprising a fail-safe function activated as a function of energy level in the energy storage device or as a function of loss of energy supply or in response to an operator command.

The control system comprises a motor control module, powered from an energy storage device, that switches on and runs the motor into a safe position in a case of emergency. A case of emergency occurs e.g. if the voltage level of the energy storage device is below a predefined threshold value or if external energy supply to the control system is lost. When an emergency condition is detected, a triggering signal is either removed or generated, as the case may be (i.e. equivalent to an emergency stop). This motor control module uses a dedicated hardware motor control circuit to run the motor into a fail-safe position. As the system is using a separate hardware circuit to control the motor into fail-safe mode, it is not necessary to account for software updates and the like.

In some embodiments, the hardware motor control circuit in the motor control module is electronically driven.

The valve control system may comprise an energy storage device being a battery.

The valve control system may comprise an energy storage device being a super capacitor.

The pre-determined fail-safe functionality of the control system makes it useful for installation subsea. The control system of the invention is useful in land-based or subsea valve applications. Other alternative applications include, without limitation, gates or doors or hatches, pistons or bolts, circuit breakers, shunts or switches, etc., which may need to be moved from an operative mode into a safety mode in response to a given process parameter.

The control system as outlined above permits the implementation of a new control method for an electric actuator. This method comprises:

arranging a second motor control module in parallel with the first motor control module, configuring the second motor control module to be effective for controlling the supply of energy to the motor in fail-safe mode, connecting the first and second motor control modules to the motor via a fail-safe switch responsive to the monitored status in supplied energy, and switching from motor control by the first motor control module to motor control by the second motor control module in response to either of:

the energy level in the energy storage device reaching, or falling below, a predetermined value, or failure in the external energy supply, or in response to an operator command.

Embodiments of the method include configuring the second motor control module with solid state or semiconductor components having pre-determined built-in functionality.

Embodiments of the method include configuring the first motor control module for execution of software coded instructions.

Other embodiments include arranging a motor drive module for modulation of energy supplied to the motor in response to input commands from either of the first or second motor control modules, separated in the fail-safe switch.

Further details, embodiments and advantages provided by the invention are discussed below in the detailed description.

SHORT DESCRIPTION OF THE DRAWINGS

The invention will now be further described with reference to the attached figures where:

FIGS. 1 and 2 are two examples of prior art that are briefly discussed above, and FIG. 3 shows an embodiment of a valve control system comprising the fail-safe function of the present invention.

DETAILED DESCRIPTION OF PREFERRED EMBODIMENTS

In the following, a control system for an electric actuator with fail-safe functionality will be described in connection with a subsea valve installation. Nevertheless, it shall be appreciated that the present invention is useful in connection also with other applications designed for setting an element or an apparatus into fail-safe mode.

Figure 3:
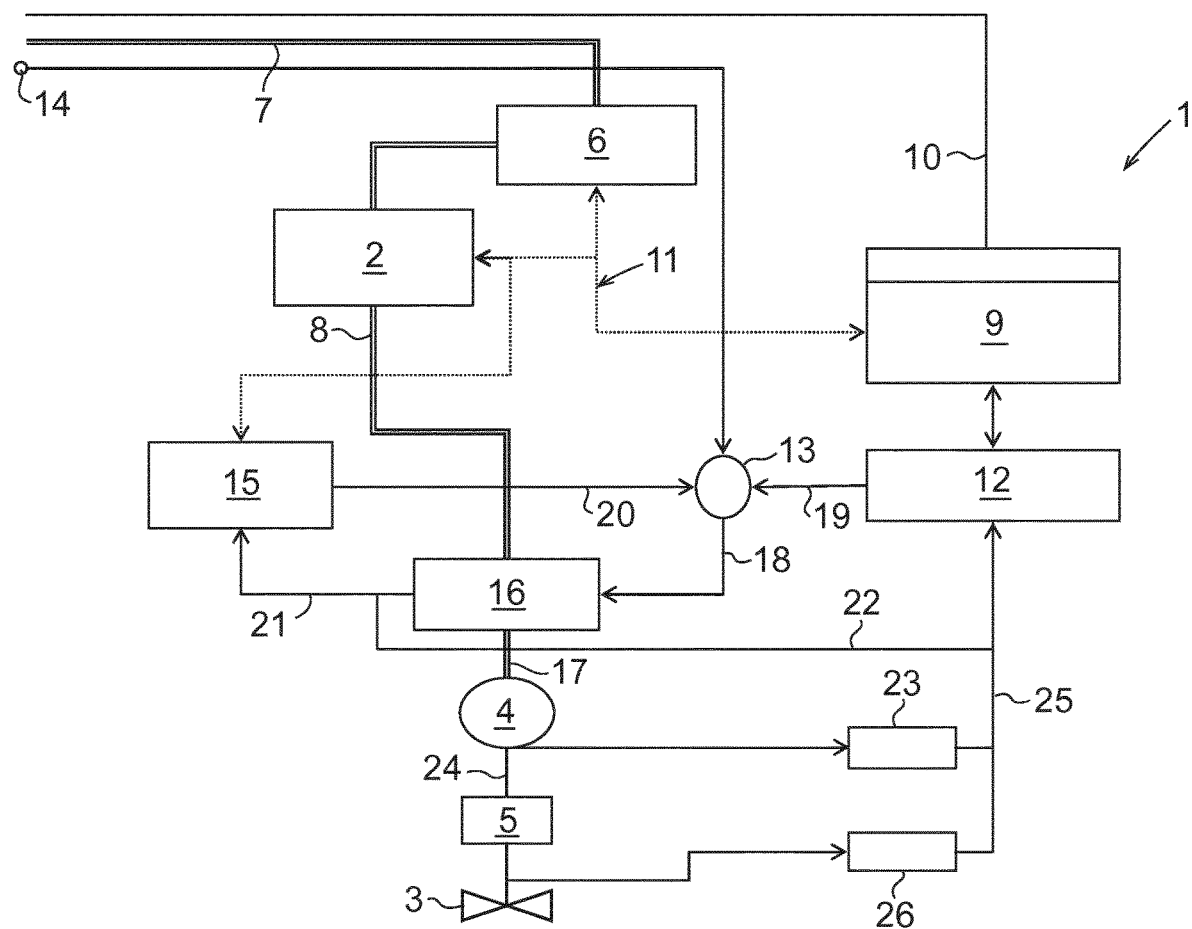

In FIG. 3, there is shown a control system 1 for an electric actuator wherein electrical energy is stored in an energy storage device 2, the energy being used to drive a mechanism that controls the position of a valve stem in a valve 3.

A motor 4 is operatively connected to the valve 3 via a gear transmission 5. The motor can be an induction motor or a brushless direct current (BLDC) or alternating current (BLAC) motor. The gear transmission 5 is arranged for conversion of the rotating movement of the motor to the torque and direction required for regulation of the position of the valve 3 between open and closed positions. The opening or closing movement may be linear or rotating as required in a gate valve or in a choke valve, whichever is appropriate for a given application.

The release of energy to the motor is controlled by a set of modules comprising various mechanical and electronic components. These components are configured in such a way as to drive the motor in a controlled fashion to a pre-determined state and/or position.

The electronic components have a defined level of reliability that ensures the required availability of the system which the electric valve actuator is a part of. The electronic components may be testable to verify that the functionality is present.

The control system 1 further comprises a power management (PM) and charger module 6. The PM/charger module 6 receives energy from an external source via a power input line 7, and transforms this energy to be usable within the control system for charging the energy storage device 2. The PM/charger module 6 may be arranged to receive DC input power from a subsea control module (SCM, not shown in FIG. 3). The PM/charger module 6 may alternatively contain e.g. an AC/DC converter and a transformer arranged for transformation of input power into a voltage and current suitable as charging power.

The energy storage device 2 is realized in the form of an accumulator (battery or capacitor). The energy storage device 2 thus stores energy and supplies this energy, on demand, to modules and devices of the control system 1.

The internal distribution of energy to the motor 4 for actuation is delivered from the energy storage device 2, as illustrated in FIG. 3 by double-drawn lines 8.

If appropriate, the internal energy distribution may alternatively include by-passing of the energy storage device 2 for a direct delivery of energy from the PM/charger module 6 to the motor 4 via a motor drive module 16.

In the control system 1, a system control module 9 contains software coded instructions for receiving and executing commands from an external device (subsea or topside, not shown in FIG. 3) via communication line 10. The system control module 9 is further arranged for reporting detected sensor data and status of the valve or the valve actuator back to the external device. The commands received in the system control module 9 are distributed to the relevant subsystems through an internal communication network 11, by which system status data can likewise be returned from the subsystems to the system control module 9. The system control module 9 may be arranged to support any available type of communication protocol towards external and internal, subsea or topside, modules and devices. The system control module 9 can be arranged for external communication via any suitable communication interface such as RS-485, CAN bus (SIIS-level-2) or Ethernet, for example. External communication may include e.g. communication with a subsea electronic module (SEM), not shown in the drawing.

The control system 1 furthermore comprises a software implemented, first motor control module 12. The first motor control module 12 receives commands from the system control module 9 to run the motor, and ensures that the motor is operated according to the commands by controlling the level of energy delivered to the motor from the energy storage device 2. The first motor control module 12 is a software based controller, the operation of which is dictated by software code.

The control system 1 further comprises a fail-safe switch 13. The fail-safe switch 13 either receives or loses a signal from an external device, and upon this change in signal status, the switch 13 ensures that the first motor control module 12 is isolated from the actuator control, the first motor control module 12 thus no longer being able to execute control of the actuator (i.e. powering of the motor and controlling the position of for example a valve).

The external device for setting the fail-safe switch 13 in fail-safe mode can be an operator command 14.

The fail-safe switch 13 further receives a signal or a signal status change from a second motor control module 15 for fail-safe (SIL, Safety Integrity Level) function. The second motor control module 15 comprises a hardware motor control circuit which, in a pre-determined way, controls the energy delivered to the motor 4 from the energy storage device 2. The pre-configured function includes a dedicated use of the energy remaining in the energy storage device 2 after reach or passage of a capacity threshold value, or a dedicated use of the energy in the energy storage device 2 after loss of external energy 7. This pre-configured function is thus not dependent on the software that is normally used to control the motor via the first motor control module 12.

In general terms, the second motor control module 15 is an integrated circuit that comprises semiconductor components with built-in functionality. As used in the disclosure, a "hardware motor control circuit" is to be understood briefly as a motor controller, the operation of which is determined by the structure and built-in functionality of solid state or semiconductor components, rather than a motor controller the operation of which is dictated by software code. The hardware motor control circuit may include semiconductor relays and switches in the second motor control module 15. The second motor control module 15 can be setup to deliver to the motor 4 a pre-determined torque and motor rotation direction as long as there is energy left in the energy storage device 2 (battery or capacitor).

Thus, upon command from the second motor control module 15, the fail-safe switch 13 carries out a pre-determined function that overrides the software coded instructions implemented in the first motor control module 12.

In other words, the fail-safe switch 13 is a selector which is triggered by either certain energy levels or manually or particular safety mode software command in order to shift from software operated motor control to hardware operated motor control.

Examples of events that will trigger the safety function include e.g. loss of energy supply (possibly with a delay to preclude false events), or upon reach or passage of a minimum level of energy in the energy storage device 2 required to drive the valve to safe position.

The control system 1 further comprises a motor drive module 16 which modulates the energy coming from the energy storage device 2 via line 8 and being supplied to the motor 4 via an energy supply line 17.

The motor drive module 16 applies the energy to the motor 4, either according to signal input 19 from the software implemented first motor control module 12 in normal operation, or according to signal input 20 from the hardware operated second motor control module 15 for SIL function in fail-safe mode, or according to operator command 14 signal input. The signal input commands 14, 19, 20 are routed to the motor drive module 16 via the fail-safe switch 13 and a signal line 18. The fail-safe switch 13 thus blocks the signal path 19 from the first motor control module 12 if it receives, or loses, a signal from the second motor control module 15 via signal path 20. Accordingly, the first motor control module 12 and the second motor control module 15 control, separately and individually, the supply of energy to the motor 4 in dependence on the position of the fail-safe switch 13.

The motor drive module 16 may be arranged for regulation of rotational direction, torque and speed of the motor 4.

If the motor 4 is realized as a BLDC motor for example, the motor drive module 16 may include a current controller for regulation of torque, and a speed controller for regulation of amplitude in the applied voltage. Thus, without limitation hereto, the motor drive module 16 may comprise a pulse width modulation module, an analogue-to-digital converter, timer, communication peripherals, etc., as known in the art of digital signal controllers.

Operating status of the motor drive module 16 can be reported back to the first and second motor control modules 12 and 15 via feedback signal lines 21 and 22.

The status and energy level in the energy storage device 2 can be reported, via the internal communication network 11, for monitoring by the second motor control module 15, as illustrated through dotted lines in FIG. 3.

The motor drive module 16 can alternatively be the physical means which monitors the level of available energy that can be delivered from the energy storage device 2. The status of the energy storage device 2 may then be reported to the first and second motor control modules 12 and 15 via the signal lines 21, 22.

Albeit disclosed herein as physically separated units, the first motor control module 12, the second motor control module 15 and the fail-safe switch 13 may in practise be incorporated on the same circuit board. A Hall sensor 23 can be arranged to detect the position of the rotating parts of the motor 4 or the motor shaft 24, and transmitting this information to the first motor control module 12 via a signal line 25 for implementation in the motor drive module 16 via input 19 to the fail-safe switch 13.

A resolver module 26 can be arranged to detect the rotary or linear position of the gear transmission 5, and transmitting this information to the first motor control module 12 via the signal line 25 for implementation in the motor drive module 16 via input 19 to the fail-safe switch 13.

The valve control system and method provides several advantages, such as:
- the safety function operates independently of software and can thus not be overridden by the same software,
- the safety function is predefined before actuation of a valve into fail-safe position,
- the software of the control system needs not be qualified for SIL functionality,
- no need to account for software updates to maintain SIL in fail-safe function.

From the above it will be appreciated that the invention can be successfully applied to an electric valve actuator in a subsea installation, or to an electric valve actuator in a land based installation. It will also be readily appreciated that the invention can likewise be successfully applied to an electric actuator for a gate, a piston, a ball valve, a plug valve or a circuit breaker, etc.

From reading the disclosure a skilled person will understand that modification of the invention within the language and wording of the claims is possible and that any such modification, also if not literally meeting the claim language, is covered by the scope of protection as defined and afforded by the claims.

The invention claimed is:

1. A control system for an electric actuator comprising:
   an electric motor;
   an energy storage device;
   a first motor control module configured to control a supply of energy from an external source to the motor in normal operation;

a second motor control module powered by the energy storage device and configured to control the supply of energy to the motor in a fail-safe mode, wherein the first motor control module and the second motor control module are connected in parallel via a fail-safe switch configured to override the control of the power supply by the first motor control module and to set the control system in the fail-safe mode by activating the second motor control module in response to an energy level in the energy storage device reaching or falling below a predetermined value.

2. The system of claim 1, wherein the first motor control module is arranged for controlling the supply of energy to the motor by executing software coded instructions, whereas the second motor control module is arranged for controlling the supply of energy to the motor as pre-determined by built-in functionality of its components.

3. The system of claim 1, further comprising a motor drive module which is arranged for modulation of the energy supplied to the motor according to input from the first motor control module in normal operation, or according to input from the second motor control module in fail-safe mode, or according to operator command input.

4. The system of claim 1, wherein the energy level status in the energy storage device is monitored by the second motor control module.

5. The system of claim 1, applied to an electric valve actuator in a subsea installation.

6. The system of claim 1, applied to an electric valve actuator in a land based installation.

7. The system of claim 1, applied to an electric actuator for a gate, a piston, a ball valve, a plug valve or a circuit breaker.

8. A method of controlling an electric actuator in a control system comprising an electric motor, an external supply of electric energy, an energy storage device and a first motor control module powered by the energy storage device which controls the supply of energy to the motor in normal operation, the method characterized by the steps of:

arranging a second motor control module in parallel with the first motor control module, configuring the second motor control module to be effective for controlling the supply of energy to the motor in fail-safe mode, connecting the first and second motor control modules to the motor via a fail-safe switch responsive to the monitored status in supplied energy, and switching from motor control by the first motor control module to motor control by the second motor control module in response to an energy level in the energy storage device reaching or falling below a predetermined value.

9. The method of claim 8, further comprising:
configuring the second motor control module with solid state or semiconductor components having pre-determined built-in functionality.

10. The method of claim 8, further comprising:
configuring the first motor control module for execution of software coded instructions.

11. The method of claim 8, further comprising:
arranging a motor drive module for modulation of energy supplied to the motor in response to signal input commands, from either the first or the second motor control module or an operator, separated in the fail-safe switch.

12. The system of claim 1, wherein the fail-safe switch is further arranged to set the control system in the fail-safe mode by activating the second motor control module in response to a failure in the external power supply or in response to an operator command.

13. The method of calm 8, wherein the fail-safe switch is further arranged to set the control system in the fail-safe mode by activating the second motor control module in response to a failure in the external power supply or in response to an operator command.

* * * * *